Jan. 1, 1929. 1,697,484
L. C. VAN PATTEN
ROTARY ROD WEEDER
Filed March 30, 1927
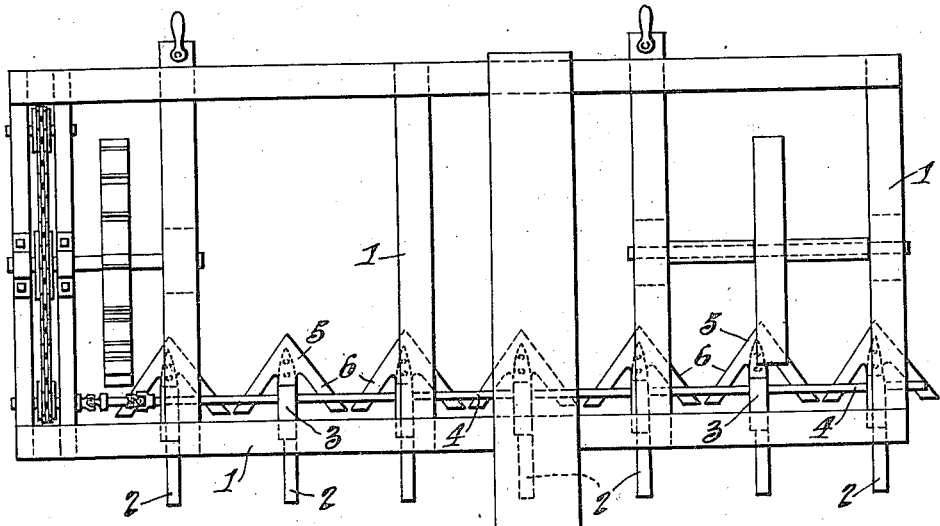
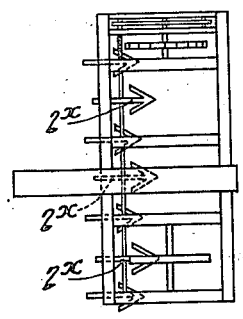
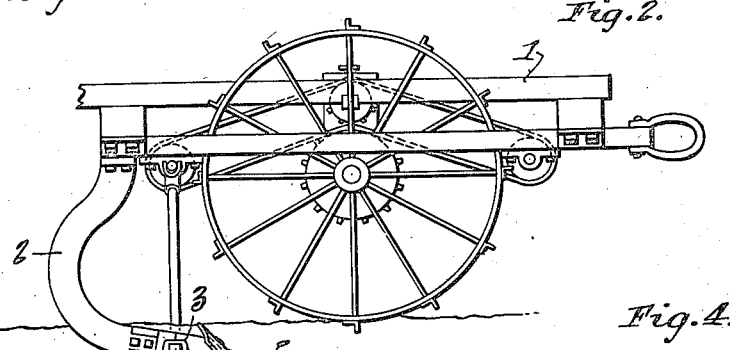
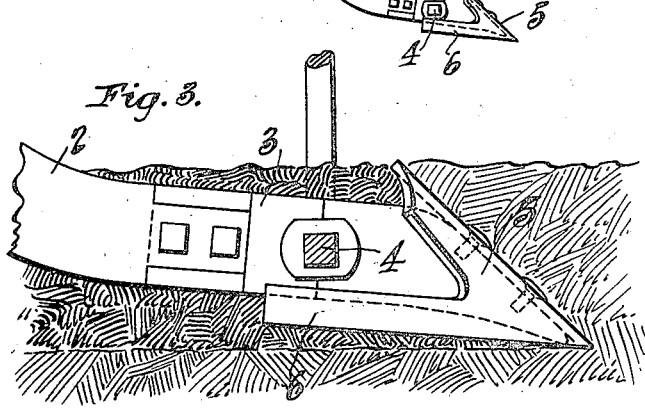
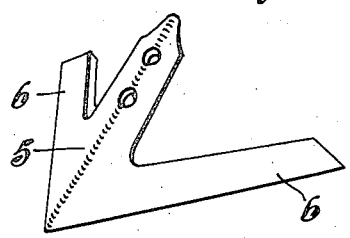
INVENTOR
L. C. Van Patten.
BY
Albert E. Dieterich
ATTORNEY Patented Jan. 1, 1929.

1,697,484

UNITED STATES PATENT OFFICE.

LOUIS C. VAN PATTEN, OF CHENEY, WASHINGTON.

ROTARY ROD WEEDER.

Application filed March 30, 1927. Serial No. 179,538.

My invention relates to that type of weeders which employ a rotating rod that is moved sidewise through the ground beneath the surface during rotation of the rod to cut and macerate the weeds. It has sometimes been found difficult to use these weeders in soddy ground when certain kinds of grass have developed in cultivating the ground, or when the ground has packed too hard for the rod to be forced into it easily.

It is, therefore, the object of this invention to provide the rod weeder with means whereby the difficulty above referred to will be overcome and by the use of which means this type of weeder can be employed under any condition of ground.

The result is accomplished by providing the bearing shoes with means located adjacent to and in front of the rotary rod, for making a horizontal cut or opening beneath the surface of the ground in advance of the rotary rod so that the rotary rod can come along through the ground that has already been cut and hence not meet with as great resistance as before.

Another object is to provide means to assist in pulling the rod down into the ground, an advantage of particular utility where hard ground is encountered.

The invention resides in those novel combinations and arrangements of parts, all of which will be first fully described, then be specifically pointed out in the appended claims, reference being had to the accompanying drawing, in which:—

Figure 1 is a plan view illustrating the invention.

Figure 2 is an end elevation.

Figure 3 is an enlarged cross section illustrating one of the bearing shoes with a cultivator shoe mounted thereon.

Figure 4 is a detail perspective view of one of the cultivator shoes per se.

Figure 5 is a diagrammatic view of a modification hereinafter referred to.

In the drawing 1 represents the frame of the weeder, 2 the standards, 3 the bearing shoes and 4 the rotary rod, all of which may be of the usual construction preferably that disclosed in Letters Patent to Henry K. Wolfe, No. 1,588,790, issued June 15, 1926.

In the practical application of the present invention it is preferable to increase the number of standards 2 and bearing shoes 3 so as to locate them closer together than is shown in the Wolfe patent referred to in order to reduce the necessary spread of the cultivator shoes which constitute a part of my present invention.

Secured to the bearing shoes 3 at their front by any approved means (such as welding or bolting, etc.) are cultivator shoes consisting of upright members 5 by which the cultivator shoes are secured to the bearing shoes and lateral wings 6 which project sidewise and rearwardly from adjacent the points of the cultivator shoes to adjacent the rotary rod. The purpose of these wings is to make an opening in a horizontal plane just in advance of or immediately below and in advance of the rotary rod so that as the machine traverses the ground the rotary rod will perform its functions in that portion of the ground which has already been cut by the cultivator shoe.

Another purpose of the cultivator shoes is to assist in causing the rod to enter and penetrate or be pulled down under the ground.

By arranging the cultivator shoes as a part of the rotary rod bearing unit the depth of the rod and cultivator shoes is regulated simultaneously by the position of the operator on the balancing board, and by locating the cultivator shoes as closely to the rotary rod as possible these variations of position do not cause an independent functioning of the cultivator shoes and the rod but effect their co-operation in such a way as to produce the result desired in the most effective way; in other words, by locating the cultivator shoes as close as possible to the rotary rod, the variations in depth of these members, caused by the change of position of the operator on the balancing board of the machine, are such as to be practically the same at all times, thus enabling the rod always to follow through the ground which has been cut by the cultivator shoes along the plane of least resistance, a thing that would not be possible were the cultivator shoes mounted a considerable distance in front of the rotary rod or carried by a separate machine operating in advance of the weeder.

If desired auxiliary supports $2^x$ and cultivator shoes may be located in advance of the rod bearing standards (see diagrammatic view Figure 5).

From the foregoing description, taken in connection with the accompanying drawing, it is thought the complete construction, operation and advantages of my invention will be clear to those skilled in the art to which it relates.

What I claim is:

1. In rotary rod weeders, the combination with a rotary rod and the supporting members therefor, of cultivator shoes having provisions for effecting a horizontal cut beneath the surface of the ground in advance of said rod, whereby the rod will pass through ground already cut, said cultivator shoes comprising upstanding supporting portions and lateral wings projecting from the upstanding portions to pass beneath the surface of the ground in advance of the rotary rod.

2. In rotary rod weeders, the combination with the rotary rod and the supporting members therefor, of cultivator shoes having provisions for effecting a horizontal cut beneath the surface of the ground in advance of said rod, whereby the rod will pass through ground already cut, said cultivator shoes comprising upstanding supporting portions and lateral wings projecting from the upstanding portions to pass beneath the surface of the ground in advance of the rotary rod, the wings of one shoe extending laterally to adjacent the wings of the next adjacent shoe.

3. In weeders of the rotary rod type, the combination with a rotary rod and its supports which includes standards and bearing shoes, of cultivator shoes secured to the bearing shoes in front of the rotary rod, said cultivator shoes having lateral wings designed to make a horizontal cut beneath the surface of the ground and providing an easy path for the passage of the rod.

4. In weeders of the rotary rod type, the combination with a rotary rod and its supports which includes standards and bearing shoes, of cultivator shoes secured to the bearing shoes in front of the rotary rod, said cultivator shoes having upstanding portions and lateral wings designed to make a horizontal cut beneath the surface of the ground and provide an easy path for the passage of the rod.

5. In weeders of the rotary rod type, the combination with a rotary rod and its supports which includes standards and bearing shoes, of cultivator shoes secured to the bearing shoes in front of the rotary rod, said cultivator shoes having lateral wings designed to make a horizontal cut beneath the surface of the ground and provide an easy path for the passage of the rod, said wings being so located with respect to the rod as to effect the horizontal cut in a plane below the axis of the rotary rod, whereby the rod will pass through the ground already loosened.

6. In rotary rod weeders, the combination with a rotary rod, its bearing shoes and standards for supporting the same; of cultivator shoes carried by said bearing shoes in advance of and in proximity to said rod, and including means to loosen the soil to enable said rod to pass through the loosened soil, said cultivator shoes including lateral blade-like extensions projected rearwardly beneath the rotary rod.

7. In rotary rod weeders, the combination with a rotary rod, its bearing shoes and standards for supporting the same; of cultivator shoes carried by said bearing shoes in advance of and in proximity to said rod, and including means to loosen the soil to enable said rod to pass through the loosened soil, said cultivator shoes including laterally projected wings, those of one shoe extending into proximity with those of the adjacent shoe.

8. In weeders having a rotary rod mounted to move parallel to itself beneath the surface of the ground, the combination therewith of cultivator shoes having lateral blade-like extensions and secured in proximity to the rod for effecting a preliminary cut of the ground in advance of the rod and a substantial distance to each side of the rod mounts, for the purpose specified.

9. In rotary rod weeders, the combination with the rotary rod, of cultivator shoes, each comprising an upstanding central part adapted to be mounted on a suitable support and laterally and rearwardly directed blade-like extensions, the extensions of one shoe terminating in proximity to those of the adjacent shoes, and means for mounting said shoes in advance of said rotary rod whereby said rod will pass through ground already cut.

LOUIS C. VAN PATTEN.